Patented Oct. 24, 1933

1,931,879

UNITED STATES PATENT OFFICE 1,931,879

METHOD OF PRODUCING A RUBBER ADHESIVE

Douglas Frank Twiss, Frederick Arthur Jones, and James Henry Anderson, Fort Dunlop, Erdington, Birmingham, England, assignors to Dunlop Rubber Company Limited, London, England, a British corporation.

No Drawing. Application December 28, 1932, Serial No. 649,234, and in Great Britain January 3, 1932

12 Claims. (Cl. 87—17)

This invention relates to the production of compositions containing derivatives of such resins as balata resin, gutta resin or similar resins associated naturally with rubber and separable therefrom by the action of solvents or of mixtures of such resins.

The main object of the invention is to provide compositions comprising said derivations particularly suitable for bonding impermeable surfaces of rigid articles, such as those of metal, glass, or hard rubber with tenacious coatings of rubber or the like.

As is well known gutta-percha, crude balata, and various guttas and rubbers especially of lower grades contain large proportions of resinous matter. Before using gutta-percha or balata or even lower grade rubbers e. g. guayule or pontianak in the various arts, it is often necessary to remove the aforesaid resins totally or in part. These resins commonly obtained are of soft solid or sticky semi-fluid consistency. This type of by-product has found little commercial application.

In the present invention such resins as balta resins, gutta-percha resins, rubber resins, or the like are converted into adhesive compositions particularly suitable for bonding rubber to surfaces such as those of metal by the action of agents such as sulphuric acid, sulphonic acids, mixtures of such acids, stannic chloride or phosphoric acid in the presence of a reactve polymerized or polymerizable unsaturated hydrocarbon, as for instance rubber.

The sulphuric acid or other reagent apparently acts catalytically to promote reactions between the resin and the hydrocarbon. It may, however, to some extent enter into combination with compounds present during the reaction. It may act as a catalyst of a polymerizing reaction, aiding the attainment of equilibrium by promoting polymerization or the reverse as conditions in the reacting system may determine.

The present invention comprises introducing agents such as sulphuric acid, sulphonic acids, mixtures of such acids, stannic chloride or phosphoric acid into a solution of a reactive polymerized or polymerizable unsaturated hydrocarbon in balata resin, gutta-percha resin, rubber resins, or the like and preferably stirring and heating the solution or admixture to about 100° to 150° C. It is important for the best results that the heating should be for a definite predetermined period. The mixture is then preferably cooled in cold water and thereafter crushed. The crushed material is then washed to remove excess acid.

The amount of reactive polymerized or polymerizable unsaturated hydrocarbon present is preferably 5% to 30% on the mixture of such hydrocarbons and balata resin and the like.

Suitable reactive polymerized or polymerizable unsaturated hydrocarbons are for instance rubber, rubber reclaim, balata, gutta, turpentine or isoprene or other butadiene hydrocarbons. A polymerized or polymerizable unsaturated hydrocarbon such as rubber is preferably employed in the masticated condition. The unsaturated hydrocarbon such as rubber however can be added in the form of an aqueous dispersion thereof. Satisfactory results have been obtained by the addition of, for example, phenol-sulphonic acid either before or after the removal of the water by evaporation. In the former case the evaporation can take place during the usual heat treatment.

It has been found desirable to cut down the amount of reagent to be used, for example, sulphonic acid to as little as possible, e. g. $3\frac{1}{2}\%$ on the total admixture. It has also been found desirable to heat for a longer time as for instance 50 to 80 hours at about 115° C.

The reaction between the balata resins and the like, the reactive polymerizable unsaturated hydrocarbons and the reagents such as sulphuric acid, sulphonic acids or mixtures of such acids can, if desired, be made to take place in the presence of suitable solvent such as petroleum naphtha, carbon tetrachloride, benzene, toluene, cyclohexane and the like.

Compositions produced as hereinbefore described can be applied in the softened or solid condition or in the form of solutions or of aqueous emulsions or dispersions thereof.

Examples of carrying the invention into effect are as follows:

*Example 1*

70 parts by weight of the semi-fluid resin obtained by extracting crude balata with a light petroleum solvent is admixed with 30 parts by weight of masticated smoked sheet rubber and maintained at 100° C. until a solution results. The solution of rubber in the balata resin is then mixed with 10% to 20% of phenol sulphonic acid, and after stirring well at 100° C. is heated to 120% to 130° C. in an air oven. After approximately 30 minutes a vigorous reaction takes place accompanied by frothing. The mixture is then removed from the oven and stirred well. When the frothing begins to subside the mass is quickly cooled in cold water and the roughly crushed material is washed to remove excess acid.

The dried product is dissolved in a suitable organic solvent such as toluene or carbon tetrachloride and applied in this form as an adhesive for rubber to metal.

A metal plate cleaned by sand blasting, pickling, or any other suitable manner is coated with the adhesive solution so that a thin even layer is obtained. After the solvent has evaporated a layer of uncured rubber is attached by pressing into contact and the rubber layer is then vulcanized by heat in the usual manner.

During the vulcanization it is desirable to hold the rubber in position by clamps in order to ensure good contact, but a very slight pressure suffices. After vulcanization the rubber is firmly attached to the metal, and the degree of adhesion even on heating to 110° is only very slightly impaired, the resistance of the rubber and metal to separation being still very good.

If the rubber covered plate is heated subsequently e. g. at 110° C. for several hours, the degree of adhesion is further enhanced.

Example II 5 grams masticated smoked sheet rubber is dissolved in 50 grams of the semi fluid resin obtained by extracting crude balata with a light petroleum solvent by maintaining the mixture at 100° C. with occasional stirring until the rubber gives a smooth viscous solution. To the solution 5.5 grams of phenol sulphonic acid is added and stirred in at 100° C. The mixture is then heated to 120° C. and a vigorous reaction takes place accompanied by a copious evolution of gases containing sulphur dioxide. When the reaction has subsided the dark colored hard reaction product is dissolved in benzene and the solution applied to a steel plate as in Example I. After applying a sheet of compounded rubber and vulcanizing by suitable treatment (viz. heating for one hour with steam under a pressure of 20 pounds) and cooling, the rubber sheet is very firmly attached to the metal surface.

Example III

To 70 parts of the semi-fluid resin obtained by extracting crude balata with a light petroleum solvent is added 50 parts by weight of pure toluene and then 30 parts of masticated smoked sheet rubber thinly sheeted. The mixture is maintained at 100° C. for about 3 hours and well stirred from time to time until a smooth solution is obtained which is then heated to 110° C. and 4 parts by weight of hot phenolsulphonic acid (at 110° C.) added and well stirred in.

The reaction mixture is then maintained at 110° C. for about 5 to 10 hours, the maintenance of constancy of temperature of the mass being assisted by the evaporation of the toluene of the temperature tends to rise. After heating the product forms a viscous thermoplastic mass which is dissolved in toluene to give about a 20% solution which may be used for the attachment of rubber to metal in the manner described in Example I.

Example IV 25 parts of masticated smoked sheet rubber are incorporated into 75 parts of the semi-fluid resin obtained by extracting crude balata with a light petroleum solvent, by heating at 100° C. and occasionally stirring during about 3 hours. When a smooth homogeneous solution has been obtained the temperature of the mass is raised to 110° C. and 3.5 parts of phenolsulphonic acid are well stirred in and the temperature maintained between 110–115° C. for 30 to 60 hours and the mass well mixed from time to time. Gases are evolved which contain sulphur dioxide. At the end of the treatment the heating is discontinued and the mass well homogenized by working in a steam heated internal mixer. This adhesive is soluble in organic solvents such as toluene and carbon tetrachloride and forms an excellent bond for rubber to metal when used in the manner described in Example I. The solid adhesive may also be used for attaching glass to wood or metal as for example in fixing lenses or mirrors in camera viewfinders. A solution of the adhesive is also valuable for attaching cork particles to metal plates as well as for general adhesive purposes.

In each of the above examples resins extracted from rubber or from gutta-percha may be substituted for the resins extracted from balata and in substantially the same proportions or mixtures of resins of two or more sources of the above type may be used. A composition containing 70 parts of gutta-percha resin, 30 parts of rubber and 20 parts of phenolsulphonic acid may for example be used.

The solid adhesive may, if desired, be dispersed in an aqueous medium by the following procedure:—

700 grams of the solid adhesive are heated in a steam jacketed internal mixer to a temperature of approximately 110° C. and 21 grams (3%) of casein stirred in followed by 35 grams (5% by weight) of oleic acid. Dilute ammonia solution (1 part of ammonium hydroxide specific gravity 0.880 to 9 parts of water) is slowly added while the stirrers are working until about 750 cc. of the ammonia solution has been added. The ammonia solution is slowly absorbed during the addition and the mass becomes lighter in color until when about 400 cc. of the ammonia solution has been added a reversal of phase occurs and the mass suddenly changes from a viscous material to a relatively thin liquid. The remainder of the ammonia solution may now be added more rapidly and may be followed by a small amount (100 cc.) of stronger ammonia solution. (1 part of ammonium hydroxide specific gravity 0.880 to 4 parts water.)

The dispersion is now cooled by circulating cold water through the jacket of the mixer and forms a light fawn colored fluid which may be used instead of the solutions of adhesive in organic solvents described in the previous examples, the mode of application of the dispersion being very similar. The adhesion obtained between rubber and metal using this dispersion is very good.

Solutions of the adhesive in organic solvents may also be dispersed in water in the above or any other known manner; on drying down such dispersions give adhesive films which are more tacky than those obtained by the use of a dispersion of the adhesive alone.

The heated reaction products obtained according to the above examples can also be treated while still hot with solid calcium hydroxide and solid magnesium oxide. After washing out any soluble salts with warm water, the adhesive so treated is found to have better keeping properties and to give very good resistance to separation on heating at 110° C. The use of alphanaphthylamine or a mixture of aldol alphanaphthylamine and aldol betanaphthylamine instead of the metallic oxides gives a somewhat similar result.

The heated reaction product may alternatively or additionally be washed with sodium hydroxide (or other alkali) solutions in order to remove excess acid; or solid sodium hydroxide may be added to the solution of the adhesive in organic solvents.

The incorporation of amorphous silica, e. g. kieselguhr and/or vulcanizing agents such as sulphur and an organic accelerator in the adhesive material may also be advantageous.

Having now particularly described and ascertained the nature of our said invention and in what manner the same is to be performed, we declare that

What we claim is:

1. A method for producing adhesive compositions suitable for bonding rubber to surfaces such as those of metal which comprises reacting a reactive polymerized or polymerizable unsaturated hydrocarbon with a resin of the group consisting of balata resin, gutta-percha resin and rubber resins in the presence of an agent of the group comprising sulphuric acid, sulphonic acids, mixtures of such acids, stannic chloride and phosphoric acid.

2. A method as claimed in claim 1 wherein the admixture is heated to 100° to 150° C.

3. A method as claimed in claim 1 wherein the amount of reactive polymerized or polymerizable unsaturated hydrocarbon present is 5% to 30% on the mixture of such hydrocarbons and balata resin and the like.

4. A method as claimed in claim 1 wherein the reactive polymerized or polymerizable, unsaturated hydrocarbon is of the group comprising rubber, rubber reclaim, turpentine, isoprene and butadiene hydrocarbons.

5. A method as claimed in claim 1 wherein a polymerized or polymerizable unsaturated hydrocarbon such as rubber is employed in the masticated condition.

6. A method as claimed in claim 1 wherein the amount of the agent to be used for example sulphonic acid is as little as possible, e. g. 3½% on the total admixture.

7. A method as claimed in claim 1 wherein the admixtures are heated for 50 to 80 hours at about 115° C.

8. A method as claimed in claim 1 wherein the reaction is made to take place in the presence of suitable solvents for balata resin, such as petroleum naphtha, carbon tetrachloride, benzene, cyclohexane and the like.

9. The method of claim 1 in which the acidity remaining after the reaction is neutralized.

10. A bonding composition comprising the reaction product of a resin of the group comprising balata resin, gutta-percha resin and rubber resins with a relatively smaller quantity of a hydrocarbon of the group comprising the rubbers, turpentine, isoprene and butadiene hydrocarbons in the presence of an agent of the group comprising sulphuric acid, sulphonic acids, mixtures of said acids, stannic chloride and phosphoric acid.

11. The composition of claim 10 in which the proportion of hydrocarbon is from 5% to 30% of the mixture.

12. A bonding composition comprising the reaction product of a resin of the group consisting of balata resin, gutta percha resin and rubber resins with a relatively small quantity of a reactive polymerized or polymerizable unsaturated hydrocarbon in the presence of an agent of the group comprising sulphuric acid, sulphonic acids, mixtures of said acids, stannic chloride and phosphoric acid.

DOUGLAS FRANK TWISS.
FREDERICK ARTHUR JONES.
JAMES HENRY ANDERSON.

CERTIFICATE OF CORRECTION.

Patent No. 1,931,879.

October 24, 1933.

DOUGLAS FRANK TWISS, ET AL.

It is hereby certified that error appears in the printed specification of the above numbered patent requiring correction as follows: In the heading to the printed specification, lines 10 and 11, date of filing in Great Britain, for "January 3, 1932" read February 3, 1932; and that the said Letters Patent should be read with this correction therein that the same may conform to the record of the case in the Patent Office.

Signed and sealed this 5th day of December, A. D. 1933.

F. M. Hopkins

Acting Commissioner of Patents.

(Seal)

The heated reaction product may alternatively or additionally be washed with sodium hydroxide (or other alkali) solutions in order to remove excess acid; or solid sodium hydroxide may be added to the solution of the adhesive in organic solvents.

The incorporation of amorphous silica, e. g. kieselguhr and/or vulcanizing agents such as sulphur and an organic accelerator in the adhesive material may also be advantageous.

Having now particularly described and ascertained the nature of our said invention and in what manner the same is to be performed, we declare that

What we claim is:

1. A method for producing adhesive compositions suitable for bonding rubber to surfaces such as those of metal which comprises reacting a reactive polymerized or polymerizable unsaturated hydrocarbon with a resin of the group consisting of balata resin, gutta-percha resin and rubber resins in the presence of an agent of the group comprising sulphuric acid, sulphonic acids, mixtures of such acids, stannic chloride and phosphoric acid.

2. A method as claimed in claim 1 wherein the admixture is heated to 100° to 150° C.

3. A method as claimed in claim 1 wherein the amount of reactive polymerized or polymerizable unsaturated hydrocarbon present is 5% to 30% on the mixture of such hydrocarbons and balata resin and the like.

4. A method as claimed in claim 1 wherein the reactive polymerized or polymerizable, unsaturated hydrocarbon is of the group comprising rubber, rubber reclaim, turpentine, isoprene and butadiene hydrocarbons.

5. A method as claimed in claim 1 wherein a polymerized or polymerizable unsaturated hydrocarbon such as rubber is employed in the masticated condition.

6. A method as claimed in claim 1 wherein the amount of the agent to be used for example sulphonic acid is as little as possible, e. g. 3½% on the total admixture.

7. A method as claimed in claim 1 wherein the admixtures are heated for 50 to 80 hours at about 115° C.

8. A method as claimed in claim 1 wherein the reaction is made to take place in the presence of suitable solvents for balata resin, such as petroleum naphtha, carbon tetrachloride, benzene, cyclohexane and the like.

9. The method of claim 1 in which the acidity remaining after the reaction is neutralized.

10. A bonding composition comprising the reaction product of a resin of the group comprising balata resin, gutta-percha resin and rubber resins with a relatively smaller quantity of a hydrocarbon of the group comprising the rubbers, turpentine, isoprene and butadiene hydrocarbons in the presence of an agent of the group comprising sulphuric acid, sulphonic acids, mixtures of said acids, stannic chloride and phosphoric acid.

11. The composition of claim 10 in which the proportion of hydrocarbon is from 5% to 30% of the mixture.

12. A bonding composition comprising the reaction product of a resin of the group consisting of balata resin, gutta percha resin and rubber resins with a relatively small quantity of a reactive polymerized or polymerizable unsaturated hydrocarbon in the presence of an agent of the group comprising sulphuric acid, sulphonic acids, mixtures of said acids, stannic chloride and phosphoric acid.

DOUGLAS FRANK TWISS.
FREDERICK ARTHUR JONES.
JAMES HENRY ANDERSON.

CERTIFICATE OF CORRECTION.

Patent No. 1,931,879.  October 24, 1933.

DOUGLAS FRANK TWISS, ET AL.

It is hereby certified that error appears in the printed specification of the above numbered patent requiring correction as follows: In the heading to the printed specification, lines 10 and 11, date of filing in Great Britain, for "January 3, 1932" read February 3, 1932; and that the said Letters Patent should be read with this correction therein that the same may conform to the record of the case in the Patent Office.

Signed and sealed this 5th day of December, A. D. 1933.

F. M. Hopkins (Seal)

Acting Commissioner of Patents.

CERTIFICATE OF CORRECTION.

Patent No. 1,931,879.　　　　　　　　　　　　　　　October 24, 1933.

DOUGLAS FRANK TWISS, ET AL.

It is hereby certified that error appears in the printed specification of the above numbered patent requiring correction as follows: In the heading to the printed specification, lines 10 and 11, date of filing in Great Britain, for "January 3, 1932" read February 3, 1932; and that the said Letters Patent should be read with this correction therein that the same may conform to the record of the case in the Patent Office.

Signed and sealed this 5th day of December, A. D. 1933.

F. M. Hopkins (Seal)　　　　　　　　　　　　　　　　　　Acting Commissioner of Patents.